Patented May 22, 1951

2,554,097

UNITED STATES PATENT OFFICE 2,554,097

N-LONG CHAIN DIALKYL-SULFENAMIDES AND PREPARATION THEREOF

Lee O. Edmonds, Bartlesville, Okla., assignor to Phillips Petroleum Company, a corporation of Delaware No Drawing. Application September 4, 1947, Serial No. 772,219

16 Claims. (Cl. 260—551)

This invention relates to high molecular weight sulfenamides, and more particularly to a series of high molecular weight alkyl sulfenamides having a relatively high degree of purity, and to the process for the preparation thereof.

Among the sulfenamides, those having relatively low molecular weights have heretofore been made, for example, by the interaction of lower alkyl sulfenyl halides with low molecular weight amines to produce the corresponding sulfenamides as disclosed in patent application Serial No. 617,871, filed September 21, 1945, now abandoned by C. M. Himel. The production, and particularly the isolation in relatively pure form, of high molecular weight alkyl sulfenamides has heretofore been unknown, even using the improved method of that application. Attempts to produce the high molecular weight alkyl sulfenamides by such process have yielded impure products due to difficulties in the distillation of the high molecular weight compounds, the impurities consisting mainly of starting materials which are not completely used in the reaction, as well as side reaction products formed during the prior processes.

The sulfenamides according to the present invention have high boiling points and high degrees of purity, and are believed to correspond to the general formula:

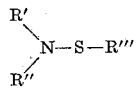

wherein the sum of the carbon atoms in R', R'' and R''' is always greater than 21; R' and R'' represent alkyl groups comprising at least 10 and as many as 18 or more carbon atoms, and R''' represents a primary, secondary, or tertiary alkyl group comprising not less than 2 carbon atoms. These compounds have numerous advantageous uses such as anti-oxidants for lubrication oils, corrosion inhibitors, and intermediates for the production of valuable organic chemicals. The reaction involved in the process of this invention may be generally expressed as the following equation:

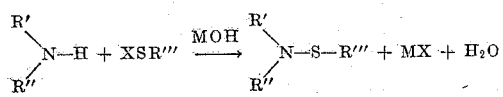

wherein the sum of the carbon atoms of R', R'', and R''' is always greater than 21 carbon atoms; R' and R'' each represent alkyl groups from 10 to 18 or more carbon atoms; R''' represents a primary, secondary or tertiary alkyl group having at least 2 carbon atoms; M is an alkali or alkaline earth metal, for example, sodium or potassium; and X represents a halogen other than fluorine, for example, chlorine, bromine or iodine. If desired, the oxides or carbonates of the alkali or alkaline earth metals may be employed in place of the hydroxides.

Unreacted secondary amines according to the formula stated above exhibit a strong tendency to crystallize with the sulfenamide product of the reaction; so that effective purification by recrystallization has heretofore been found to be impossible. Attempts to extract pure sulfenamides from the above reaction by distillation of the crude reaction mixture have also met with failure even at pressures as low as 1 mm. due to the high boiling point of the products and their instability under these conditions. Similarly, attempts to remove unreacted amines, or high molecular weight alkyl mercaptans or disulfides used in the preparation of the sulfenyl halides, by extraction with ethyl or propyl alcohol, or related or higher alcohols, at ordinary or high temperatures, have been unsuccessful, since the high molecular weight sulfenamides are soluble in the alcohols above methanol.

One of the features of this invention is the unexpected insolubility of high molecular weight sulfenamides in hot methanol. This is particularly surprising since, first these high molecular weight sulfenamides are soluble in hot ethanol and higher molecular weight alcohols and, second, the relatively low molecular weight sulfenamides are completely soluble in hot methanol. It is thus possible to separate the high molecular weight sulfenamides, which are insoluble in hot methanol, from the unreacted amines, mercaptans, disulfides and byproducts which are soluble in hot methanol, by treating the mixture with this solvent. Further purification is, if desired, accomplished by recrystallization from acetone.

In practicing the invention the alkyl sulfenyl halide may conveniently be prepared by reacting, at elevated temperatures, elemental halogen, such as chlorine, bromine or iodine with a dialkyl disulfide or alkyl mercaptan after admixture thereof with an inert hydrocarbon solvent, preferably in a reactor equipped with a reflux condenser. The elemental halogen is preferably added at a rate such that substantially complete utilization of the halogen is effected during the addition. When substantially half of the mercaptan or disulfide has been converted to the corresponding alkyl sulfenyl halide, the halogenation is interrupted. The use of an excess of mercaptan or disulfide as described has been found to give a more easily purified sulfenamide product. To this reaction mixture is then added, preferably in an amount essentially equivalent to the amount of sulfenyl halide present, a dialkyl amine in which the alkyl groups contain preferably between 10 and 18 carbon atoms, although a higher number of carbon atoms may occur in either or both radicals. An aqueous solution of an alkali or alkaline earth metal hydroxide, oxide or carbonate may be present to take up hydrogen halide liberated. The reaction is allowed to continue to completion after which the crude mixture is allowed to cool and the sulfenamide product is removed and purified.

The inert solvent media employed in the reaction are preferably low boiling paraffinic hydrocarbons or mixtures thereof. In the practice of my invention I have generally preferred to employ those which boil between 25 and 50° C., for example, n-pentane, iso-pentane or appropriate mixtures of paraffinic hydrocarbons, e. g. iso-pentane, or n-pentane. However, any of the more stable paraffinic hydrocarbons or mixtures of such hydrocarbons boiling between —35 and +65° C. may be employed when desired. The boiling points of these solvents at atmospheric pressure conform to the suitable range of reaction temperatures. It is essential that the solvent used be free from appreciable amounts of sulfur or sulfur compounds, oxygen compounds, nitrogen compounds, aromatic or naphthenic hydrocarbons, olefins, acetylenes diolefins, or any other impurities which would objectionably interfere with the reaction or contaminate the product. It is also essential that the solvent medium be substantially anhydrous.

The halogen employed is preferably chlorine, due to its low cost and ready availability, although bromine and iodine may also be used. Addition of the chlorine is generally effected in the gaseous state although its introduction in the liquid state may be desirable in some instances. When operating with bromine or iodine they may be supplied to the reaction in the liquid or solid state, respectively.

Stirring of the mixture during the addition of the halogen establishes more intimate contact of reactants and consequently a higher degree of conversion to the desired product. While the refluxing action usually provides adequate agitation of the system, mechanical stirring or other suitable means may be employed if desired.

The alkyl radicals in the mercaptan and the disulfide, and hence in the alkyl sulfenyl halide produced therefrom, contain at least 2 carbon atoms, including, for example, ethyl, propyl, isopropyl, n-butyl, isobutyl tert-butyl amyl, hexyl, cyclohexyl, n-heptyl, or tert-heptyl radicals, etc. The alkyl substituents in the dialkyl amines are preferably decyl, undecyl, dodecyl, tridecyl, tetradecyl, pentadecyl, hexadecyl, heptadecyl or octadecyl, but may include even higher radicals, such as nonadecyl, eicosyl, etc., or combinations thereof. The alkyl groups attached to the sulfur or to the nitrogen of the final product may be either straight chain, branched chain or cycloalkyl radicals, although they should be saturated hydrocarbon groups.

Without intending to limit the scope of the invention to the particular examples referred to herein, the following illustrations, in which the parts are expressed by weight, are representative of the invention.

Example I

One-hundred and seventy-eight grams of di-tert-butyldisulfide were discovered in 1200 cc. pentane (B. P. 36.3° C.) and the temperature raised until the solvent was refluxing steadily. Gaseous chlorine was then bubbled into the mixture at such a rate as to provide essentially complete utilization of the chlorine as evidenced by the absence of chlorine in the vent gases. After 35.5 grams chlorine had been metered into the reaction mixture, the addition was suspended. Three hundred and fifty-three grams didodecyl amine were then added along with 170 cc. of 20 per cent aqueous sodium hydroxide to the well stirred reaction mixture and the mixture allowed to reflux steadily. At the end of an hour the mixture was cooled to room temperature. This product was then extracted four times with 400 cc. hot methanol. The residue was taken up in 1500 cc. acetone at room temperature and crystallized at 0° C.. Acetone of crystallization was removed by heating the product at 100° C. in vacuo at 2 mm. for three hours. After separation and drying a yield of 238 grams of N, N-di-n-dodecyl-tert-butyl-sulfenamide, M. P. about 34° C. was obtained.

Example II

The experiment of Example I was repeated using isopentane (B. P. 27–29° C.) as the solvent medium. Since the yield of the sulfenyl chloride is highly sensitive to temperature with an optimum temperature of about 25–30° C., the actual yield of sufenyl chloride was determined to be better than 85 per cent. The high purity of the sulfenyl chloride made the purification step easier. The pure sulfenamide was isolated in 85 per cent yield.

Example III

Tert-butylsulfenyl chloride was prepared in isopentane solution as in Example II. The sulfenyl chloride solution was added slowly to a reaction mixture consisting of 521 grams of dioctadecylamine, 500 cc. of water, 40 grams of sodium hydroxide, and 400 cc. n-pentane. After the reaction was complete, the sulfenamide product was isolated and purified as in Example I.

Example IV

Tert-heptylsulfenyl chloride was prepared from a fraction of tert-heptyl mercaptan, the latter comprising a mixture of tert-mercaptans prepared by addition of $H_2S$ to heptylenes. The sulfenyl chloride was prepared as in Example II and added to a reaction mixture consisting of 352 grams of didodecyl amine, 500 cc. of water, 40 grams of sodium hydroxide, and 500 cc. of pentane. The product was purified by the procedure of Example I and isolated in 75 per cent yield.

Example V

Ethylsulfenyl chloride was prepared by the chlorination of 62 grams of ethyl mercaptan in 1200 cc. isopentane (B. P. 27–29° C.). Previous data indicated that this process gave a minimum 75 per cent yield of the ethylsulfenyl chloride in solution. The sulfenyl chloride was added to a suspension of 1042 grams of dioctadecyl amine in 500 cc. pentane. When the reaction was complete, the product was stirred with 40 grams of sodium hydroxide in 800 cc. of water. The sulfenamide was purified and freed from excess amine by the procedure of Example I. In this process, using ethyl-sulfenyl chloride, it is important to add the sulfenyl chloride to the amine and not the reverse. This precaution and the use of anhydrous amine is not important when using tert-butylsulfenyl chloride.

In view of the many changes and modifications that may be made without departing from the principles underlying the invention, reference should be made to the appended claims for an understanding of the scope of the protection afforded the invention.

What is claimed is:

1. A sulfenamide corresponding to the formula

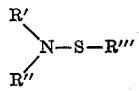

in which R' and R" are alkyl groups each containing at least 10 carbon atoms, R'" is an alkyl group containing at least 2 carbon atoms.

2. A sulfenamide as defined in claim 1 in which R' and R" each contain between at least 10 and about 18 carbon atoms.

3. A sulfenamide as defined in claim 1 in which R' and R" are both dodecyl radicals.

4. N, N-di-n-dodecyl-tert-butyl-sulfenamide.

5. N, N-di-n-octadecyl-tert-butyl-sulfenamide.

6. N, N-di-n-dodecyl-tert-heptyl-sulfenamide.

7. In the process of producing a high molecular weight alkyl sulfenamide which comprises reacting an alkyl sulfenyl halide having at least two carbon atoms in the alkyl group with a dialkyl amine having at least 10 carbon atoms in each alkyl group, the step which comprises removing impurities by extracting with hot methanol.

8. The process of claim 7 in which the reaction takes place in the presence of a paraffinic hydrocarbon having a boiling point between about 25° and 50° C. at the refluxing temperatures thereof.

9. The process of claim 7 in which the halide is a chloride.

10. The process of claim 7 in which the alkyl sulfenyl halide is tert-butyl sulfenyl chloride.

11. The process of claim 7 in which the alkyl sulfenyl halide is tert-heptyl sulfenyl chloride.

12. The process of claim 7 in which the dialkyl amine is didodecyl amine.

13. The process of claim 7 in which the dialkyl amine is dioctadecyl amine.

14. The process of claim 7 in which tert-butyl sulfenyl chloride is reacted with didodecyl amine.

15. The process of recovering a high molecular weight alkyl sulfenamide from a reaction mixture formed by reacting an alkyl sulfenyl halide having at least 2 carbon atoms in the alkyl group with a dialkyl amine having at least 10 carbon atoms in each alkyl group, which comprises treating said mixture with hot methanol.

16. The process of recovering a sulfenamide corresponding to the formula

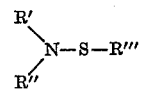

in which R' and R" are alkyl groups each containing at least 10 carbon atoms, R'" is an alkyl group containing at least 2 carbon atoms, said sulfenamide being formed by a sulfenyl halide-dialkylamine reaction, which comprises removing said reaction starting materials therefrom by extracting with hot methanol.

LEE O. EDMONDS.

REFERENCES CITED

The following references are of record in the file of this patent:

UNITED STATES PATENTS

| Number | Name | Date |
|---|---|---|
| Re. 19,286 | Zaucker et al. | Aug. 21, 1934 |
| 2,123,082 | Schulze | July 5, 1938 |
| 2,244,075 | Mikeska | June 3, 1941 |
| 2,268,467 | Ashworth | Dec. 30, 1941 |
| 2,333,468 | Cooper | Nov. 2, 1943 |
| 2,419,283 | Paul et al. | Apr. 22, 1947 |
| 2,424,921 | Smith et al. | July 29, 1947 |
| 2,439,734 | Himel et al. | Apr. 13, 1948 |
| 2,474,237 | Eby | June 28, 1949 |

OTHER REFERENCES

Rheinboldt et al.: "Ber. deut. chem.," vol. 72 (1939), pp. 659, 663, 664, 665 and 670.